US008576747B2

(12) United States Patent
Wang et al.

(10) Patent No.: US 8,576,747 B2
(45) Date of Patent: Nov. 5, 2013

(54) DISTRIBUTED SCHEDULING OF QUIET-PERIOD FOR IN-SERVICE CHANNEL MONITORING

(75) Inventors: Jianfeng Wang, Ossining, NY (US); Kiran S. Challapali, New City, NY (US); Dave A. T. Cavalcanti, Ossining, NY (US)

(73) Assignee: Koninklike Philips N.V., Eindhoven (NL)

( * ) Notice: Subject to any disclaimer, the term of this patent is extended or adjusted under 35 U.S.C. 154(b) by 311 days.

(21) Appl. No.: 12/744,422

(22) PCT Filed: Nov. 24, 2008

(86) PCT No.: PCT/IB2008/054930
§ 371 (c)(1),
(2), (4) Date: May 24, 2010

(87) PCT Pub. No.: WO2009/069069
PCT Pub. Date: Jun. 4, 2009

(65) Prior Publication Data
US 2010/0246442 A1 Sep. 30, 2010

Related U.S. Application Data

(60) Provisional application No. 60/990,313, filed on Nov. 27, 2007.

(51) Int. Cl.
*H04L 12/28* (2006.01)
(52) U.S. Cl.
USPC .......................................................... 370/254
(58) Field of Classification Search
USPC ................... 370/241, 254, 328, 329, 458
See application file for complete search history.

(56) References Cited

U.S. PATENT DOCUMENTS

2007/0165586 A1 7/2007 Taylor

FOREIGN PATENT DOCUMENTS

| WO | WO02007040610 A1 | 4/2007 |
| WO | WO2007064708 A2 | 6/2007 |

(Continued)

OTHER PUBLICATIONS

IEEE 802.22 Working Group of the LAN/MAN Standards Committee: "IEEE P802.22/DO.3.7, Draft Standard for Wireless Regional Are Networks Part 22: Cognitive Wireless RAN Medium Access Control (MAC) and Physical layer (PHY) Specification: Policies and Procedures for Operation in the TV Bands", XP002525238, Jul. 1, 2007.

(Continued)

*Primary Examiner* — Dang Ton
*Assistant Examiner* — Nourali Mansoury
(74) *Attorney, Agent, or Firm* — Larry Liberchuk

(57) ABSTRACT

In a distributed-control cognitive radio network, each secondary user (200) in a network broadcasts parameters (125) that indicate the minimum quiet-period sensing demand for regular quiet-periods that the device requires for reliable detection of a primary user (290). Each device (200) in the network adjusts its quiet-period sensing rate to accommodate the highest minimum sensing demand (155, 160), thereby providing optimal efficiency relative to quiet-period support while assuring that all devices (200) in the network are provided at least their minimum quiet-period sensing demand (150). Both the interval between regular quiet-periods and the duration of these quiet-periods are negotiated among the devices on the network (155). A quiet-period index (140) is used to synchronize all of the devices to a common time base. Techniques are also provided for efficient coordination of on-demand quiet-period requests, and for supporting different quiet-period schedules for multiple classes of primary users.

21 Claims, 2 Drawing Sheets

(56) References Cited

FOREIGN PATENT DOCUMENTS

| WO | WO2007083257 A1 | 7/2007 |
| WO | WO2007094604 A1 | 8/2007 |
| WO | WO2007096819 A2 | 8/2007 |

OTHER PUBLICATIONS

Carlos Cordeiro et al., "Spectrum Sensing for Dynamic Spectrum Access of TV Bands", Cognitive Radio Oriented Wireless Networks and Communications, 2007, Aug. 1, 2007, pp. 225-233, XP031276051.

M. Bellec et al., "A PHY/MAC Proposal for IEEE 802.22—WRAN Systems—IEEE P802.22 Wireless RANs—doc—IEEE 802.22-06/0005r1", XP007902888, pp. 1-90, Jan. 2006.

IEEE 802.22-06/0005R1, Local Detection At Each CPE, Jan. 2006, pp. 91-180.

IEEE 802.22-06/0005R1, Clustering: Physical Cluster, Jan. 2006, pp. 181-222.

DISTRIBUTED SCHEDULING OF QUIET-PERIOD FOR IN-SERVICE CHANNEL MONITORING

This invention relates to the field of cognitive radio communications, and in particular to a method and system for scheduling quiet-periods among distributed users to facilitate channel monitoring.

Cognitive radio is a communication scheme in which a device monitors licensed channels for activity, and establishes communications only on an inactive channel. It is a particularly viable solution for providing unused communications bandwidth to local area communication networks, such as allowing home networks to operate on unused television broadcast channels. Such home networks are commonly used to allow devices and appliances within a household to communicate and interact with each other, generally under a user's direct or pre-programmed command. Such communications may range from a user command to preheat an oven, to the exchange of audio/visual information among cameras, recorders, displays, and the like.

For the purposes of this disclosure, the authorized and/or licensed user of a channel, such as a television broadcaster, is termed a primary user of the channel, whereas users of channels that are not being used by primary users are termed secondary users.

An essential element for the successful sharing of unused channels by secondary users is the ability to determine that a channel is, in fact, not being used by a primary user. A quiet-period (QP) is defined as a time during which all of the secondary users refrain from transmitting on a channel; such quiet-periods may be regularly scheduled or scheduled on-demand. Generally, regularly scheduled quiet-periods allow for rapid sensing, because a device need only enable its sensing equipment at the scheduled time; however, the duration of the quiet-period may be too short for some devices, or may lead to inefficiencies if it is too long for most devices. On-demand sensing, on the other hand, requires coordination between the requesting device and all of the other devices, but it allows a device to set the duration of the requested quiet-period to a length that is optimal for the particular device.

Regular and on-demand scheduling is reasonably easy to implement on a network that operates under centralized control, but is significantly more difficult to implement on a network with distributed control. This difficulty is further compounded in networks that span multi-hop distances, because not all devices will be in direct communication with each other.

It would be advantageous to provide a scheduling scheme that allows regular and on-demand quiet-periods to be efficiently scheduled in a distributed-control network. It would also be advantageous to provide a scheduling scheme that allows regular and on-demand quiet-periods to be efficiently scheduled in a multi-hop network.

These advantages, and others, can be realized by a method and system wherein, in a distributed-control cognitive radio network, each secondary user in a network broadcasts parameters that indicate the minimum quiet-period sensing demand for regular quiet-periods that the device requires for reliable detection of a primary user. Each device in the network adjusts its quiet-period sensing rate to accommodate the highest minimum sensing demand, thereby providing optimal efficiency relative to quiet-period support while assuring that all devices in the network is provided at least their minimum quiet-period sensing demand. Both the interval between regular quiet-periods and the duration of these quiet-periods are negotiated among the devices on the network. A quiet-period index is used to synchronize all of the devices to a common time base.

The invention is explained in further detail, and by way of example, with reference to the accompanying drawings wherein.

Throughout the drawings, the same reference numeral refers to the same element, or an element that performs substantially the same function. The drawings are included for illustrative purposes and are not intended to limit the scope of the invention.

Figure 1:
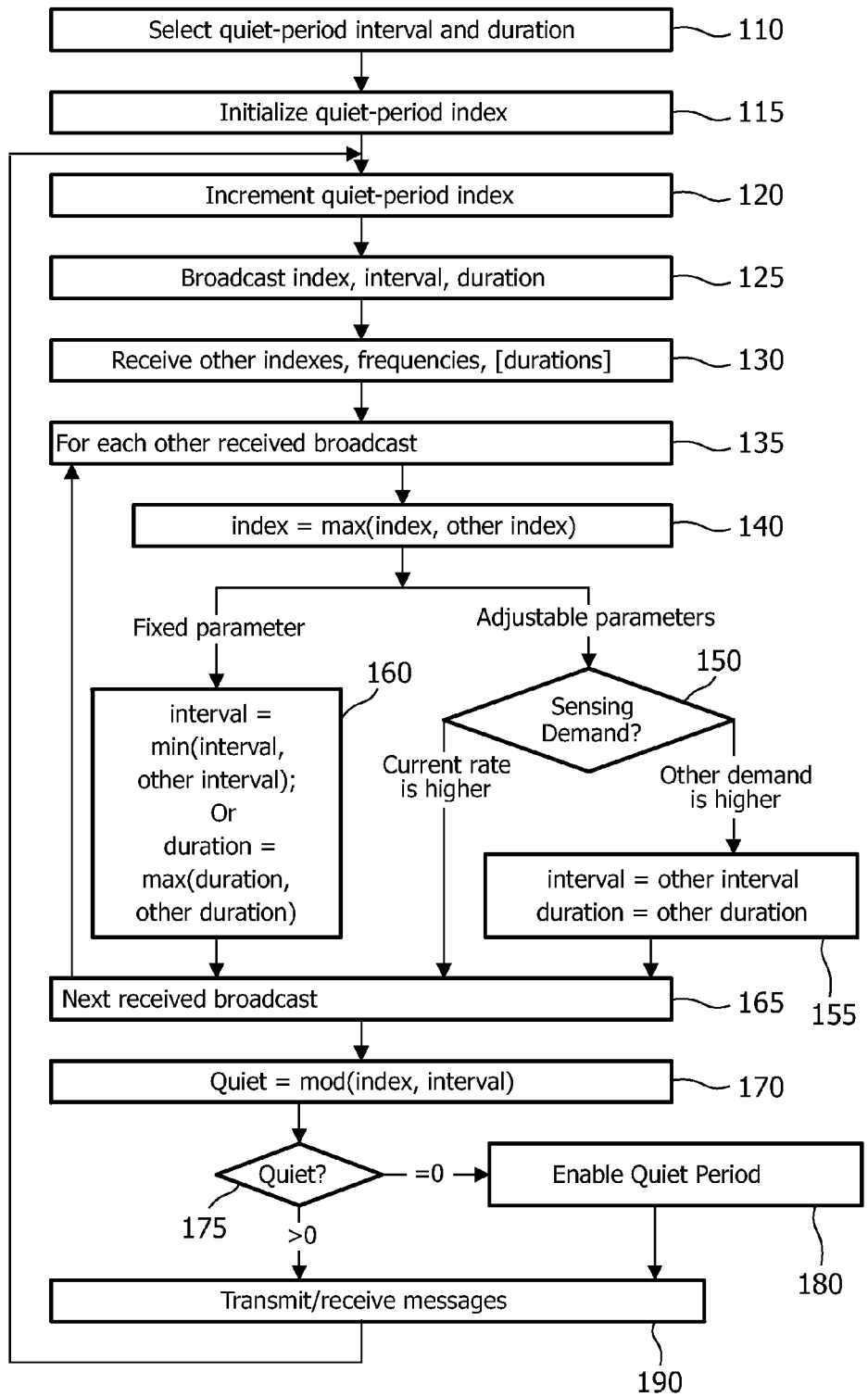
FIG. 1 illustrates an example flow diagram of a quiet-period process that assures convergence and synchronization to a common set of quiet-period parameters among nodes of a multi-hop network with distributed control.

In the following description, for purposes of explanation rather than limitation, specific details are set forth such as the particular architecture, interfaces, techniques, etc., in order to provide a thorough understanding of the present invention. However, it will be apparent to those skilled in the art that the present invention may be practiced in other embodiments, which depart from these specific details. For purposes of simplicity and clarity, detailed descriptions of well-known devices, circuits, and methods are omitted so as not to obscure the description of the present invention with unnecessary detail.

As discussed above, the invention addresses devices and networks that are dynamically re-locatable among a variety of possible channels. In a typical embodiment, the possible channels are channels that are generally allocated or licensed to primary users, such as television broadcasters, but the actual occupancy of each channel varies. For example, due to the likelihood of interference, the allocation of television channels to broadcasters in a given area is restricted to every-other channel, leaving half of the channels in the available spectrum empty. In other environments, the occupancy of a channel by a primary user varies with time. Dynamically re-locatable networks can take advantage of the inefficiently utilized spectrum by establishing themselves on unused channels. For ease of understanding, the invention is presented using a one-to-one correspondence between defined channels and the utilization of the channel by a secondary user network. One of skill in the art will recognize, however, that multiple networks may be supportable within one channel, or, multiple channels may be required to support one network, without departing from the intent and scope of this invention.

As technologies advance, the number of devices with communications capabilities can be expected to increase exponentially, and, correspondingly, the number of devices that will be configured to act as secondary users on licensed/controlled channels will also increase. Although each of these secondary user devices will be configured to avoid transmitting on channels that are occupied by primary users, some devices may be in a 'fringe' area of a primary user's broadcast, or in an interior room with poor reception of external broadcasts, and may not recognize the primary user's presence. As such, this secondary user may transmit on the channel, and this transmission may overwhelm recognition of the primary user's presence at other secondary devices in proximity to this secondary user. As each of these other secondary devices transmits on this channel, recognition of the primary user's presence at further secondary devices will be adversely affected. Therefore, to assure that primary users will be recognized, there must be certain times when all of the secondary devices on a channel are silent, to avoid this cascading interference effect.

Consider the task of having all nodes in a network to agree to be silent at a particular time, for a duration that is sufficient for all currently active devices to reliably recognize the presence of a primary user. In a centrally managed network, the central controller can periodically direct all devices on the network to be silent for a duration sufficient for some or most of devices to detect a primary user, and direct a change of channel if any of the devices report the presence of a primary user. In ad-hoc networks, such as a home network, it cannot be assumed that a device with network controlling capabilities will be present; nor can it be assumed that multiple control-capable devices may be present, with conflicting control agendas. Accordingly, network protocols have been developed to allow operation of networks without central controllers. Without a central controller, a protocol for secondary user networks must include a means for having each of the devices agree to a common set of quiet-period parameters, and for each of the devices to synchronize its operation to a common time base, absent a control device that dictates the quiet-period parameters, and without any particular device being relied upon for providing the common time base.

A regular quiet-period is defined as a quiet-period of a given duration that occurs periodically. For ease of reference the periodicity of the regular quiet-period is defined herein in terms of the interval between regular quiet-periods. In a protocol based on superframes, for example, the interval may be defined as the number of superframes between quiet-periods. For example, a quiet-period interval of five corresponds to a quiet-period occurring at every fifth superframe; i.e. the quiet-period interval is the inverse of the quiet-period frequency. It is assumed herein that the more detailed parameters of the regular quiet-period, such as whether the quiet-period occurs at the beginning or end of the superframe, or occurs at a specific time within the superframe, can be predefined for all devices without impacting the overall efficiency of the network.

Although a standard could be established that predefines a required interval and duration of quiet-periods, it is recognized that different devices will have different capabilities with regard to the detection of primary users. Some devices may include complex filters that are custom-designed to detect distinctive features of primary user broadcasts, such as a filter that detects the specific carrier or synchronization signals that are present in conventional television broadcasts. Other devices may merely include an energy detector that classifies a channel as being occupied by a primary user if the accumulated energy over a given time period exceeds a particular threshold value. In view of this variability among devices, such a standard would need to accommodate the 'lowest common denominator' of sensing capabilities, and would likely be too inefficient to accommodate networks with high quality of service (QoS) requirements.

Alternatively, a standard could be established that predefines either the interval or duration of quiet-periods, but not both. With such a standard, the members of a particular network would merely need to agree on the parameter that is not predefined, and synchronize their operations to avoid transmissions during the agreed upon quiet-periods. That is, assuming that each device has a minimum sensing 'demand', in terms of the total number/volume of sensing samples required for reliable detection over a sensing cycle, this total number of samples can be accumulated during a few long duration quiet-periods within each sensing cycle, or during many short duration quiet-periods within each sensing cycle. In this manner, assuming that the fixed parameter (interval, duration) is defined such that any device can achieve its sensing demand by an appropriate choice of the adjustable parameter (duration, interval), each network would only be limited in performance by its least capable member, and, in networks having high quality of service requirements, membership could be restricted to devices having a minimum level of sensing capabilities.

Preferably, to provide further flexibility and improved network efficiency, a standard could be established that allows devices on a network to adjust both the interval and the duration of regular quiet-periods. As noted above, a predefined interval or duration must be such that any secondary device can achieve its sensing demand by adjusting the other parameter. However, this predefined parameter may be excessive for high performance devices, reducing the achievable performance of a network of such high performance devices.

In a preferred embodiment, a common set of quiet-period parameters are negotiated among the secondary users of a network to define the interval and duration of the quiet-periods, and a common time base is established among the devices. Preferably, each device communicates its current set of quiet-period parameters, and an algorithm is defined that allows each device to easily adapt its parameters based on the parameters received from other devices so that all of the devices quickly converge upon the common set of quiet-period parameters. Obviously, if either the interval and/or duration is predefined, its value is not negotiated, and the devices do not adapt to a different value. Given a commonly accepted interval and duration of quiet-periods relative to a common time base, each device can avoid transmitting during each of these regularly occurring quiet-periods, thereby avoiding the aforementioned cascading interference effects.

FIG. 1 illustrates an example flow diagram of a process that assures convergence and synchronization to a common set of quiet-period parameters among nodes of a network with distributed control. The method is initially presented for the more general case of both the interval and duration of the quiet-period being negotiable, and the special case of having either one predefined is addressed separately.

At 110, the device initially selects or determines a preferred quiet-period interval and duration, based on its capabilities for reliably detecting the presence of a primary user on a channel. To achieve maximum network efficiency, these parameters are selected as the maximum interval and minimal duration required for reliable detection at a reasonable confidence level. The quiet-period interval is preferably defined relative to defined periods of the underlying message-transfer protocol. In a slot-based protocol, the interval can be defined as a given number of time-slots; in a superframe-based protocol, wherein a superframe comprises multiple time-slots and other signaling to facilitate the definition and control of the multiple time-slots, the interval can be defined as a given number of superframes. In like manner, the quiet-period duration is preferably defined relative to a recognized time measure, such as the duration of a time-slot.

In a preferred embodiment, to facilitate rapid convergence to an agreed upon set of parameter values, each of the interval and duration values are selected from a finite set of values. A maximum interval will generally be defined to assure that the network regularly monitors for a new arrival of a primary user. A minimum interval and/or maximum duration will generally be defined to avoid the inefficiencies of excessively frequent and/or excessively long sensing periods. Optionally, sets of recommended interval/duration pairs can be defined to achieve given sensing demands, to further facilitate rapid convergence. In like manner, instead of allowing each of the interval and duration values to be selected independently, the selection of interval and duration values may be limited to a finite set of paired values.

At 115, a quiet-period index is initialized. The quiet-period index is an index that is used to facilitate synchronization to a common time base, the convergence to a common index corresponding to a convergence to a common time base. In a straightforward embodiment, the quiet-period index is incremented with each occurrence of the units used to define the quiet-period interval. That is, for example, if the quiet-period interval is defined in terms of a number of superframes, the quiet-period index is incremented with each superframe. Conceptually, the quiet-period index corresponds to the 'phase' of the superframes within the quiet-period interval. Note that, initially, with each device independently initiating its quiet-period index, the devices will be 'out of phase'. One device may consider a current superframe as the 'first' superframe, while another device may consider it as the 'ninth' superframe, another as the 'twentieth' superframe, and so on. Thus, even if each of these devices agrees upon a common interval of superframes between quiet-periods, each device will observe the quiet-period at a different superframe. In order for all devices to observe the quiet-period at the same superframe, all of the devices must be in phase with each other relative to the quiet-period.

Given that each device is similarly configured to independently select or initialize the quiet-period index, interval, and duration, the method of FIG. 1 is provided to facilitate an adjustment of some or all of these parameters at some or all of the devices so as to rapidly converge upon a common set of quiet-period parameters at each device that supports all the devices on the network and also optimizes the efficiency of the network with regard to quiet-periods.

In the example embodiment, an underlying superframe, or similar message-transfer protocol is assumed, wherein each superframe includes an initial period within which devices broadcast 'beacons' that contain information that facilitates the management and control of a subsequent message-transfer period. For example, the beacon may include a request to transmit a message in a subsequent superframe, an acknowledgement of a request to transmit from another device in a prior superframe, and so on. In a preferred embodiment, the device beacon is also configured to broadcast the current quiet-period parameters of the device. One of skill in the art will recognize, however, that the principles and scope of this invention are not limited to networks that use a superframe architecture. In an alternative embodiment, for example, the quiet-period parameters may be communicated as the content of an explicit message from the device to some or all of the other devices in the network.

The loop 120-190 corresponds to each cycle of the underlying message-transfer protocol; in this example, to each superframe of the aforementioned example protocol. At 120, the quiet-period index is incremented, using a modulo count corresponding to the range of index. As this index corresponds to a measure of phase among the devices relative to the occurrence of quiet-periods, its range of values need only extend across an interval corresponding to the longest defined quiet-period interval. Generally, a sixteen-bit word will be sufficient for use as the index. Other phase-indexing techniques may also be used. In an alternative embodiment, for example, the index is initialized to the quiet-period interval, decremented with each cycle, and reset to the quiet-period interval when the index reaches zero.

At 125, the device broadcasts its current quiet-period index, interval, and duration. (If one of the interval or duration parameters is predefined among all devices, its value is not broadcast.) Each of the other devices in range of this device will receive this device's parameters. Correspondingly, this device will receive the broadcasts of the current quiet-period parameters at other devices in its vicinity, at 130.

The device assesses the quiet-period parameters from the other devices via the loop 135-165 to determine whether it needs to adjust its parameters to accommodate the sensing requirements of any of the other devices.

At 140, the device's current index is updated to be equal to the highest index received, if the highest index is larger than the device's current index. By setting each device's index to the highest current index among communicating devices, eventually all devices in the network will have the same index, and thereby be in phase with each other. Alternative schemes consistent with this technique of synchronizing the phase of each device relative to the quiet-period interval may also be used. For example, the device's index could be set to the lowest current index, or other statistic that characterizes the set of indexes of the communicating devices, provided that the same indexing scheme and the same synchronizing rule is applied at each of the communicating devices.

At 150, the current quiet-period parameters of the device are compared to each of the received sensing demands. The sensing demand can be defined as the quiet-period duration divided by the quiet-period interval. For ease of reference, the term sensing 'rate' at a device is used to indicate the satisfiable demand, based on the current quiet-period parameters at the device. Initially, a device's sensing rate is equal to its demand, but as its interval and/or duration parameters are adjusted to accommodate the demands of less sensing-capable devices, the sensing rate at the device will exceed the device's original demand.

If the duration is defined in terms of a number of time-slots, and the interval is defined in terms of a number of superframes between quiet-periods, the sensing rate corresponds to an average number of sensing time-slots per superframe. A higher number of sensing time-slots per superframe corresponds to a higher demand for sensing samples, or, equivalently, indicates a device with lesser capabilities. Because the quiet-periods should accommodate all of the devices on the network, the device is configured to agree to a higher demand by adopting the other device's interval and duration parameters to satisfy this higher demand, at 155. If this device's current sensing rate is higher, no changes are made to its current quiet-period interval and duration parameters.

Different combinations of interval and duration can result in the same sensing rate. Any number of rules for tie-breaking can be applied at 150, in the event that the current interval, duration pair differs from the other device's interval, duration pair yet each provide the same sensing rate. An example rule may be that more frequent sensing (lower interval) is preferred to a longer quiet-period duration, or vice versa. Or, as noted above, a recommended interval, duration pair can be provided for each sensing rate.

It is noted that the above algorithm assumes that any combination of interval and duration that provides the same sensing rate is equivalently suitable at each device. If this is not the case, and a device cannot achieve reliable primary user detection using an other device's choice of interval and duration for providing a given sensing rate, the device can either retain its current values of interval and duration, or select an acceptable interval-duration pair that provides a slightly higher sensing rate, so that the other device can adopt these parameters, if acceptable. In an alternative embodiment, if a device can adopt either set of interval, duration parameters, the device is configured to randomly or alternatively select each set when a tie occurs. In this way, a device that can select either pair will eventually converge to the pair that is repeatedly asserted by another device. To avoid a lock between devices that cannot accept each other's interval-duration pair that each provide the same sensing rate, a currently selected device is 'forced' to select an interval-duration pair with a higher sensing rate after a given number of "tied, but not the same pair" cycles. As noted above, a set of preferred interval-duration pairs can be defined to span the range of feasible sensing rates, and to facilitate convergence, devices that are unable to agree to a particular interval-duration pair can be restricted to select only from this set.

By initially setting each device's quiet-period interval and duration to the minimum sensing demand required for reliable detection of the primary user at each device, and by subsequently agreeing to modify the quiet-period interval and duration parameters at each device to accommodate the highest required sensing demand, the operation of the network converges to optimal efficiency by providing the minimum sensing rate among all of the devices on the network while satisfying this highest required sensing demand.

Note that in the case of a system in which one of the interval or duration parameters is predefined, this same principle of accommodating the highest minimum sensing demand can be used to optimize the efficiency of the network. However, because one of the parameters is fixed, the sensing rate need not be explicitly determined and tested. Instead, because the sensing rate is directly proportional to the quiet-period duration and inversely proportional to the quiet-period interval, selecting the higher duration or the lower interval will result in the selection of the higher sensing demand, at 160.

After adjusting the quiet-period index and sensing rate based on broadcasts from other devices, the device enters the conventional message transfer phase. This phase may include observation of a quiet-period in which no transmissions occur.

At 165, the index of the current transfer period (e.g. the index of the superframe) is assessed to determine if a quiet-period is scheduled for this transfer period. As noted, the quiet-period interval corresponds to the number of superframes between quiet-periods, and thus the modulo of the index at the interval will be zero at each quiet-period interval. If the modulo of the current index is zero, the device's transmitter is configured to observe the quiet-period during a portion of the transfer period corresponding to the agreed-upon quiet-period duration.

At 190, messages are transmitted and received as defined by the underlying message transfer protocol, except during the quiet-period, if enabled. The process loops back to 120 to repeat the quiet-period updating and message transfer procedures. In this manner, if a new device joins the network, or a sensing demand arrives from a distant device on the network, the device will be appropriately configured to observe the regular quiet-periods. Note that while all the devices are converging to an agreed upon set of quiet-period parameters, some devices may not be synchronized to the proper quiet-period schedule, but this out-of-sync situation will resolve itself as each device on the network converges to the synchronization and minimum sensing rate, as defined above.

Although the above process assures that the minimum sensing demand of each device on a network is satisfied, there may be occasions when a device desires additional sensing time. For example, a device may be configured to determine that a primary user is present if a measure is above a first threshold, and not present if the measure is below a second threshold, but undecided if the measure is between the first and second threshold values. In this situation, the device can use additional sensing time to resolve the matter.

In a conventional reservation-based system, wherein, upon request, a device is allocated one or more transmission time-slots during the message transfer phase, each device only transmits during its allocated time slot(s). As such, to enable an on-demand quiet-period, a device need only request transmission time-slots for the required on-demand duration, and then avoid transmitting during its allocated transmission time-slots.

In some protocols, the allocation to each device is limited, to assure that any one device does not overwhelm the network. In another embodiment of this invention, a device is enabled to ask another device to forego transmitting during the other device's allocated time slot. Such a scenario would likely be used, for example, by a master in a master-slave relationship to secure quiet-periods without sacrificing its allocations of transmission time-slots.

Although the above reserve-but-don't-use technique allows any device to obtain on-demand quiet-periods, the use of this technique can lead to substantial inefficiencies, as each of many devices on the network secures a quiet-period for individual use, either directly or indirectly.

In accordance with one aspect of this invention, a device that intends to obtain an on-demand quiet-period by not transmitting during its allocated time-slots can enable other devices to use this quiet-period by notifying them of the device's intention to not transmit. In this manner, the number of individual quiet-periods can be substantially reduced, as multiple users 'share' the same quiet-period. The notification of quiet-period creation to other users will be dependent upon the particular protocol; in a beacon-based system, this notification is preferably included in the beacon in which the device acknowledges its allocation of time-slots.

To further simplify this on-demand request and notification process, the reservation-based protocol can be modified to support a specific 'quiet-period request' in addition to the conventional 'transmission-period request'. The effect of the quiet-period request will be allocation of time-slots based on the request, as in the transmission-period request, but providing a specific quiet-period request allows for certain efficiencies. Foremost, because the request is specifically for a quiet-period, the broadcast of the request serves to notify the other devices that the requesting device will not be transmitting during the allocated time slots, and a separate notification is not required. Additionally, conventional reservation-based protocols generally include overhead processes to assure that the intended receiver is available to receive the message before the time-slots are allocated. Because a quiet-period request does not have an intended receiver, per se, this overhead can be avoided. In like manner, in a protocol that limits the allocation of transmission time-slots to each device, a request for quiet-period time-slots may not count toward the device's allocation limit, or may count at a reduced rate.

Figure 2:
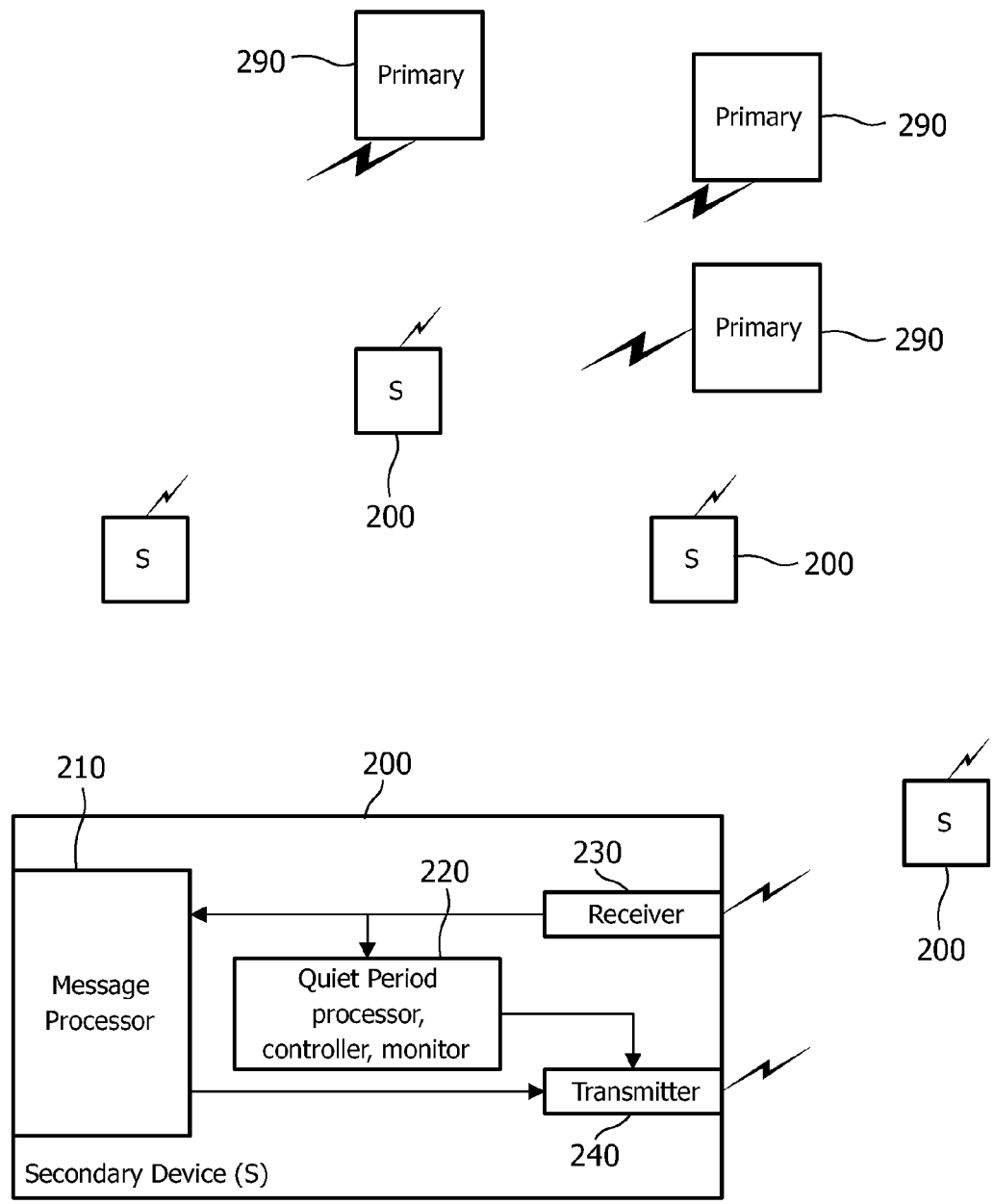
FIG. 2 illustrates an example block diagram of a node with a quiet-period processor in accordance with this invention.

FIG. 2 illustrates an example system of dynamically re-locatable secondary user devices (S) 200 operating in an environment of primary users (P) 290. As discussed above, the primary users 290 are generally the authorized and/or licensed users of available channels in a spectrum, and the secondary devices 200 are configured to avoid interfering with these primary users 290 while also using channels in the spectrum.

An example block diagram of one of the secondary devices 200 is illustrated in FIG. 2. The example device 200 includes a quiet-period processor 220 that receives quiet-period parameters from other devices 200 via receiver 230, and adjusts its operation to satisfy the quiet-period parameters of the device in the network with the highest demand for sensing time. The secondary device 200 includes a message processor 210 for transmitting and receiving messages, and a transmitter 240 that transmits messages and other signals, such as the aforementioned beacon signals, subject to the agreed-upon quiet-period restrictions.

Preferably, the quiet-period processor 220 is configured to control the regular quiet-period processing, monitoring, and control consistent with the example flow diagram of FIG. 1, detailed above, as well as the on-demand quiet-period control techniques, also discussed above. Of particular note, the quiet-period processor 220 is configured to avoid transmitting during any regular quiet-period based on a set of agreed-upon quiet-period parameters, and is also configured to notify other devices whenever it is configured to avoid transmission during an allocated time-slot using a protocol that provides reserved time segments.

The foregoing merely illustrates the principles of the invention. It will thus be appreciated that those skilled in the art will be able to devise various arrangements which, although not explicitly described or shown herein, embody the principles of the invention and are thus within its spirit and scope. For example, the above detailed regular quiet-period scheduling is presented for establishing a single periodic quiet-period, although the principles presented herein could easily be applied to establish multiple quiet-period schedules. For example, different schedules may be applied at different times of the day, or different days of the week, based on the schedules of the primary user. Similarly, different types of primary users may have different types of transmission characteristics. In the general sense, if the environment includes multiple classes of primary users, with different scanning requirements applicable to each class, different schedules can be provided to accommodate each class of primary user. Preferably, an interval-duration pair will be independently established for each class, using, for example, the process 110-165 of the flow diagram of FIG. 1 for each class. The resultant set of interval-duration pairs is then processed to provide overlapping quiet-period durations where feasible. For example, if one member/class of the set has an interval of four superframes, and another has an interval of eight, the quiet-period of each eighth superframe need only be one period of a duration that is equal to the longer duration of the two. These and other system configuration and optimization features will be evident to one of ordinary skill in the art in view of this disclosure, and are included within the scope of the following claims.

In interpreting these claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function;

e) each of the disclosed elements may be comprised of hardware portions (e.g., including discrete and integrated electronic circuitry), software portions (e.g., computer programming), and any combination thereof;

f) hardware portions may be comprised of one or both of analog and digital portions;

g) any of the disclosed devices or portions thereof may be combined together or separated into further portions unless specifically stated otherwise;

h) no specific sequence of acts is intended to be required unless specifically indicated; and i) the term "plurality of" an element includes two or more of the claimed element, and does not imply any particular range of number of elements; that is, a plurality of elements can be as few as two elements.

We claim:

1. A method comprising:
    determining one or more quiet-period parameters of a first device,
    broadcasting the quiet-period parameters,
    receiving one or more other quiet-period parameters from a second device,
    setting at least one of the quiet-period parameters of the first device equal to at least one of the other quiet-period parameters when a sensing demand of the second device is greater than a sensing rate of the first device,
    repeating the broadcasting, receiving, and setting, and
    avoiding transmission from the first device during a quiet-period corresponding to the quiet-period parameters of the first device,
    wherein the sensing demand of the second device is based on one or more of the quiet-period parameters of the second device, and the sensing rate of the first device is based on one or more of the quiet-period parameters of the first device.

2. The method of claim 1, wherein the quiet-period parameters include a measure of an interval between sequential quiet-periods.

3. The method of claim 2, wherein the quiet-period parameters include a measure of a duration of the quiet-period.

4. The method of claim 3, wherein the measure of the interval and the measure of the duration are selected from a finite set of interval-duration pairs.

5. The method of claim 3, wherein the quiet-period parameters include a measure of a phase of the quiet-period relative to the interval.

6. The method of claim 5, wherein the measure of the phase includes an index that is updated with each unit of the measure of the interval, and the method includes selectively setting the index of the first device to an index of the second device based on a synchronizing rule that is common to the first device and the second device.

7. The method of claim 1, wherein one or more of the quiet-period parameters are selected from a finite set of parameter values.

8. The method of claim 1, wherein the quiet-period parameters correspond to one of a set of quiet-period parameters, each member of the set corresponding to a different class of primary user.

9. A method comprising:
    defining a quiet-period interval at a first device corresponding to a number of transmission units between periodic quiet-periods,
    broadcasting a first index corresponding to a phase of a current transmission unit relative to the quiet-period interval,
    receiving a second index from a second device,
    selectively setting the first index at the first device equal to the second index based on a synchronizing rule that is common to the first device and the second device, the synchronizing rule including setting the first index equal to at least one of: a minimum of the first index and the second index, and a maximum of the first index and the second index, and
    avoiding transmission during a quiet-period based on the first index.

10. The method of claim 9, including:
    broadcasting the quiet-period interval, the quiet-period interval corresponding to a parameter of a sensing rate of the first device, receiving an other quiet-period interval from the second device, the other quiet-period interval corresponding to a parameter of a sensing demand of the second device, and selectively setting the quiet-period interval equal to the other quiet-period interval when the sensing demand exceeds the sensing rate.

11. The method of claim 10, including:

broadcasting a quiet-period duration, the quiet-period duration corresponding to a further parameter of the sensing rate, receiving an other quiet-period duration from the second device, the other quiet-period duration corresponding to a further parameter of the sensing demand, and selectively setting the quiet-period duration equal to the other quiet-period duration when the sensing demand exceeds the sensing rate.

12. The method of claim 9, including:

broadcasting a quiet-period duration, the quiet-period duration corresponding to a parameter of a sensing rate of the first device, receiving an other quiet-period duration from the second device, the other quiet-period duration corresponding to a parameter of a sensing demand of the second device, and selectively setting the quiet-period duration equal to the other quiet-period duration when the sensing demand exceeds the sensing rate.

13. The method of claim 9, wherein the first index is incremented with each transmission unit occurrence, and the quiet-period is dependent upon a modulo of the first index with respect to the quiet-period interval.

14. The method of claim 9, wherein the first index is decremented with each transmission unit occurrence, and the first index is periodically reset to equal the quiet-period interval.

15. A device comprising:

a receive, a transmitter, a processor that is configured to:

broadcast one or more quiet-period parameters, receive, via the receiver, one or more other quiet-period parameters from an other device, set at least one of the quiet-period parameters equal to at least one of the other quiet-period parameters when a sensing demand of the other device is greater than a sensing rate of the device, and controlling the transmitter to avoid transmission during a quiet-period corresponding to the quiet-period parameters, wherein the sensing demand of the other device is based on one or more of the quiet-period parameters of the other device, and the sensing rate of the device is based on one or more of the quiet-period parameters of the device.

16. The device of claim 15, wherein the quiet-period parameters include a measure of an interval between sequential quiet-periods, and a measure of a duration of the quiet-period.

17. The device of claim 16, wherein the quiet-period parameters include a measure of a phase of the quiet-period relative to the interval, and the processor is configured to selectively set an index of the device to an index of the other device based on a synchronizing rule that is common to the device and the other device.

18. A device comprising:

a receive, a transmitter, a processor that is configured to:

define a quiet-period interval corresponding to a number of transmission units between periodic quiet-periods, broadcast, via the transmitter, an index corresponding to a phase of a current transmission unit relative to the quiet-period interval, receive, via the receiver, an other index from an other device, selectively set the index equal to the other index based on a synchronizing rule that is common to the device and the other device, the synchronizing rule including setting the index equal to at least one of: a minimum of the index and the other index, and a maximum of the index and the other index, and control the transmitter to avoid transmission during a quiet-period based on the index.

19. The device of claim 18, wherein the processor is configured to:

broadcast the quiet-period interval, the quiet-period interval corresponding to a parameter of a sensing rate, receive an other quiet-period interval from the other device, the other quiet-period interval corresponding to a parameter of a sensing demand, and selectively set the quiet-period interval equal to the other quiet-period interval when the sensing demand exceeds the sensing rate.

20. The device of claim 19, wherein the processor is configured to:

broadcast a quiet-period duration, the quiet-period duration corresponding to a further parameter of the sensing rate, receive an other quiet-period duration from the other device, the other quiet-period duration corresponding to a further parameter of the sensing demand, and selectively set the quiet-period duration equal to the other quiet-period duration when the sensing demand exceeds the sensing rate.

21. The device of claim 18, wherein the processor is configured to:

broadcast a quiet-period duration, the quiet-period duration corresponding to a parameter of a sensing rate, receive an other quiet-period duration from the other device, the other quiet-period duration corresponding to a parameter of a sensing demand, and selectively set the quiet-period duration equal to the other quiet-period duration when the sensing demand exceeds the sensing rate.

* * * * *